Figures 1, 2:
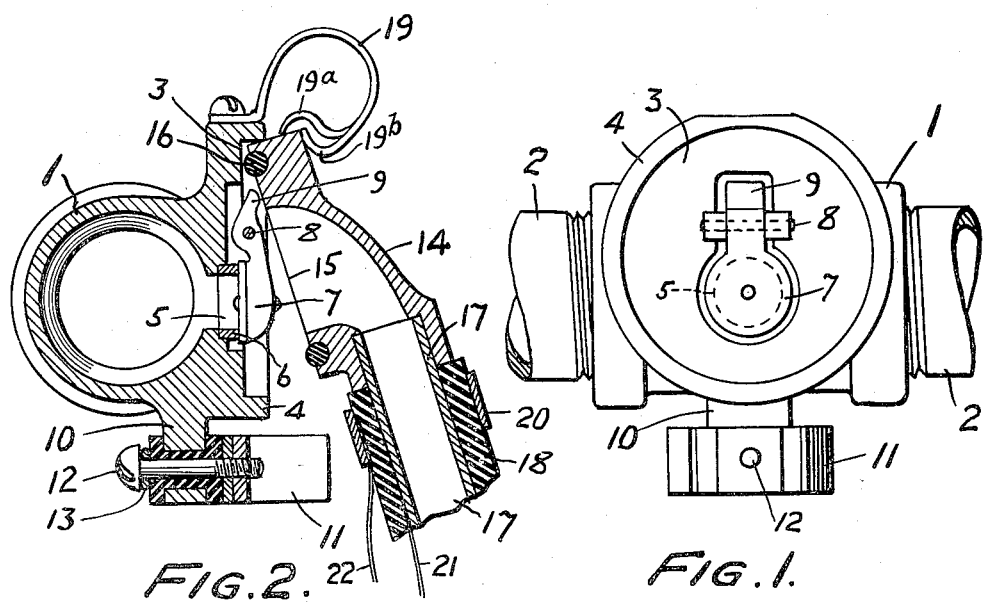

March 24, 1942. J. L. HULBERT 2,277,229
CONNECTOR FOR MILKING MACHINES
Filed Oct. 30, 1939

WITNESS:
Rob't R. Mitchel.

INVENTOR
John L. Hulbert
BY
Busser and Harding
ATTORNEYS

Patented Mar. 24, 1942

2,277,229

UNITED STATES PATENT OFFICE 2,277,229

CONNECTOR FOR MILKING MACHINES

John L. Hulbert, Poughkeepsie, N. Y., assignor to the De Laval Separator Company, New York, N. Y., a corporation of New Jersey Application October 30, 1939, Serial No. 302,005

12 Claims. (Cl. 173—326)

My invention is an improvement in devices for connecting a hose to a permanent pipe line that is particularly adaptable for connecting a flexible hose, that leads to a milking machine unit, to the rigid, permanently installed vacuum pipe line of the milking installation.

The object of my invention is the provision of means that will enable a milking machine operator, by the simplest possible operation, to make pneumatic connections and, if desired, electrical connections, between the milking machine and the permanently installed vacuum pipe line. A device embodying my invention, simple and inexpensive, is capable of making the desired connection and disconnection easily and quickly, is not likely to get out of order, and allows no leakage of air while connected or disconnected and only a minimum amount during the momentary period required to connect or disconnect.

In the drawing which illustrates a preferred embodiment of my invention—

Figures 3, 4:
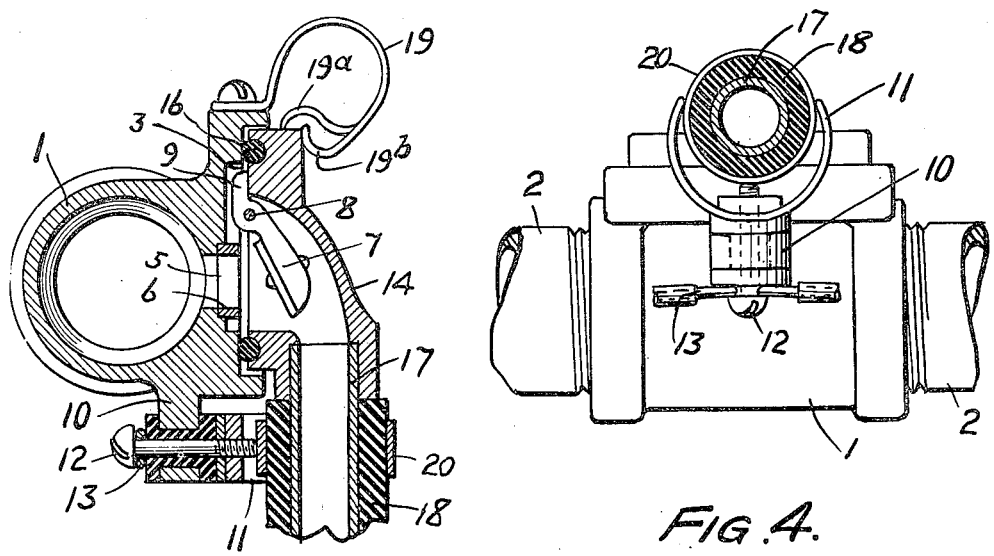

Fig. 1 is a front view of a fitting to be screwed in the vacuum pipe line. Fig. 2 is a cross section of the fitting, the hose and the terminal connector, at the end of the hose, being applied to the fitting. Fig. 3 is a similar cross section after the hose terminal connector has been applied. Fig. 4 is a bottom view of the fitting and hose terminal connector.

A fitting body 1 has its ends threaded to receive the ends of pipes which constitute sections of the vacuum pipe line 2 of a milking installation. This body has at one side a flat surface 3 surrounded by a rim 4. From a depression in the flat surface, a hole 5, through a valve seat 6, leads to the inside of the fitting. A valve 7, swinging on a pivot 8 and having a lug 9 projecting beyond the pivot, is adapted, when in its low position, to contact the valve seat 6 and close the hole 5.

Supported by but electrically insulated from a lug 10, projecting from the body 1, is a spring 11 in electrical communication, through a screw 12, with a conducting wire 13 leading to one pole of a source of electric current supply. The pipe line 2 electrically connects with the other pole.

The hose and terminal connector includes a body 14 with a flat surface 15 in which grooves are cut to receive compressible packing ring 16, preferably made of rubber, and a tubular extension 17 adapted to fit the inside of one end of a rubber hose 18.

Attached to the fitting 1 is a spring 19 with a sharp pointed portion 19a adapted to scratch clean, and make good electrical contact on, the terminal connector 14 and another portion 19b which presses against the back of the terminal connector 14 and holds its upper end toward the fitting 1.

A metallic ring 20 surrounds the hose 18 and, when the terminal connector is in place, as shown in Figs. 3 and 4, makes electrical contact with spring 11. Wires 21 and 22 lead from the tubular extension 17 and the ring 20 to any electrically operable devices that may be embodied in the milking machine unit.

Milking machine units to which the invention is applicable are shown in a number of prior patents. For example, the device described and shown is particularly adapted for use with a milking machine of the type shown in Hapgood Patent No. 1,745,092, dated January 28, 1930, in which the pulsator is operated by an electromagnet; but the same fittings, with the electrical connections omitted, is adapted for use with an automatic pneumatic pulsator of the type shown in Hulbert Patent No. 2,138,921, dated December 6, 1938.

In operation the pipe line 2 is connected with some form of pump which maintains in it and the fittings a pressure considerably less than that of the atmosphere, as is well understood.

The valves 7 are so hung from their pivots 8 that they drop by gravity into contact with the valve seats 6. When the pressure in the fitting is reduced below atmospheric, the higher pressure of the atmosphere forces each valve tightly against its seat, as shown in Fig. 2, and prevents any entrance of air through the hole 5.

When it is desired to connect a hose with the pipe line, the upper end of the terminal connector 14 is pushed in between the spring 19b and the flat surface 3 and up against the sharp point 19a which, as the terminal connector is swung from the position shown in Fig. 2 to that shown in Fig. 3, will scrape off dirt or corrosion products and thus insure a good electrical contact. In the inward swinging movement of the terminal connector, the gasket 16 contacts with the flat surface 3. As the terminal connector is being pressed toward the fitting its flat surface 15 strikes the lug 9 on the valve 7, forces it inward and, by lifting the valve off its seat, opens communication between the pipe line 2 and the hose 18. This exhausts the space inside the packing, and atmospheric pressure on the large area of the back of the terminal connector holds it tightly in place.

As the terminal connector approaches a vertical position, the ring 20 is forced between the tips of the spring 11, thus giving a mechanical guide and support. At the same time, a complete circuit is established through pipe line 2, fitting 1, spring 19, and the body 14 and tubular extension 17 of the terminal connector, to wire 21, and from wire 22 through ring 20, spring 11 and screw 12 to the conductor 13.

With the hose thus connected with the pipe line, air can be exhausted from, and electrical impulses transmission to, a milking machine with an electrically operated pulsator.

For use with a milking machine having a pneumatically operated automatic pulsator the wires 21 and 22 will be omitted, and if the device is made solely for operation with a pneumatically operated pneumatic pulsator, all the hereinbefore elements having a purely electrical function may be omitted.

When through milking, the operator need only pull the hose out horizontally away from the fitting. The ring 20 will be pulled from between the ends of the spring 11 and break the electrical connection. The packing 16 will be pulled away from the flat surface 3 and momentarily let air into the space around the valve 7, which will, as soon as the upper part of the terminal leaves the lug 9, fall and be pressed against the valve seat 6 and thus seal the pipe line 2 against continuing admission of air.

What I claim and desire to protect by Letters Patent is:

1. A device for connecting and disconnecting the vacuum pipe line of a milking machine installation with the portable hose of a milking machine unit, comprising means providing a port opening from the interior of the pipe line to the atmosphere, a valve adapted by the pressure of the atmosphere to be normally seated on and held in position to close said port, a terminal connector carrying said hose having a passage communicating with said hose and adapted to be placed in position to connect said hose through said passage with said port and seal said port and passage from the atmosphere, and means, operable in the placement of the connector, to seal said valve against atmospheric pressure and at the same time unseat it and thereby pneumatically connect the hose with the pipe line.

2. A device for connecting and disconnecting the vacuum pipe line of a milking machine installation with the portable hose of a milking machine unit, comprising a fitting forming a part of the pipe line and having a port opening from the interior of the pipe line to the atmosphere, a valve normally held against said port by atmospheric pressure, the fitting having a face surrounding said port and valve, a terminal connector carrying said hose and having a passage, communicating with said hose, surrounded by a face adapted to make air-tight connection with said face of the fitting when the connector is applied thereto, and means, operable in the placement of the connector, to unseat said valve and thereby pneumatically connect the hose with the pipe line.

3. A device for connecting and disconnecting the vacuum pipe line of a milking machine installation with the portable hose of a milking machine unit, comprising a fitting forming part of the pipe line and having a port opening from the interior of the pipe line to the atmosphere, a valve normally held against said port by atmospheric pressure, a terminal connector carrying said hose and having an opening in its face communicating with said hose, compressible sealing means on said face surrounding said opening, said connector being adapted to be so placed against said fitting as to connect said port and opening and by said sealing means close them from the atmosphere, said connector being subjected when so placed to atmospheric pressure adapted to hold it in such position, and means, operable in said placement of the connector, to unseat said valve to thereby afford fluid communication between the vacuum pipe line and the hose.

4. A device for connecting and disconnecting the vacuum pipe line of a milking machine installation with the portable hose of a milking machine unit for exhausting air therefrom, comprising a fitting forming part of the pipe line and having a port, a valve normally held against said port by atmospheric pressure, a terminal connector carrying said hose and having an opening in its face communicating with said hose, said connector being adapted to be placed against said fitting so as to connect said opening with said port, means operable in the placement of the connector to open said valve, thereby, through said port and opening, providing closed air communication between said hose and pipe line, an arcuate spring the central part of which is carried by said fitting, and a ring on the hose adapted, in the placement of the connector, to be forced between the free ends of said spring to thereby guide the connector to, and support it in, its connecting position.

5. A device for connecting the vacuum pipe line of a milking machine installation with the portable hose of a milking machine unit for exhausting air therefrom, and to simultaneously therewith electrically connect such unit with a source of electrical energy, comprising a fitting forming part of the pipe line and having a port, a valve normally held against said port by atmospheric pressure, a terminal connector carrying said hose and having an opening in its face communicating with said hose, said connector being adapted to be placed against said fitting so as to enclose said port, means operable in the placement of the connector to open said valve, thereby, through said port and opening, providing closed air communication between said hose and pipe line, an electrical conductor extending along the pipe line, electrical terminals, forming part of the milking machine unit, one in electrical connection with the connector and the other insulated therefrom, means adapted, upon the placement of the connector, to close the circuit through said conductor to the second of said terminals, and means closing the circuit between the fitting and the connector, said last named means comprising a spring carried by the fitting and between which and the fitting the end of the connector extends when the conductor is placed in position.

6. A device for connecting the vacuum pipe line of a milking machine installation with the portable hose of a milking machine unit for exhausting air therefrom, and to simultaneously therewith electrically connect said unit with a source of electrical energy, comprising a fitting forming part of the pipe line and having a port, a valve normally held against said port by atmospheric pressure, a terminal connector carrying said hose and having an opening in its face communicating with said hose, said connector being adapted to be placed against said fitting so as to enclose said port, means operable in the placement of the connector to open said valve, thereby, through said port and opening, providing closed air communication between said hose and pipe line, an electrical conductor extending along the pipe line, electrical terminals, forming part of the milking machine unit, one in electrical connection with the connector and the other insulated therefrom, means adapted, upon the placement of the connector, to close the circuit through said conductor to the second of said terminals, and means closing the circuit between the fitting and the connector, said last named means comprising two spring members carried by the connector, between one of which and the fitting the end of the connector extends when the connector is placed in position, the other spring member having a sharp end adapted to scratch the end face of the connector during the latter's placement.

7. A device for connecting the vacuum pipe line of a milking machine installation with the portable hose of a milking machine unit for exhausting air therefrom, and to simultaneously therewith electrically connect such unit with a source of electrical energy, comprising a fitting forming part of the pipe line and having a port, a valve normally held against said port by atmospheric pressure, a terminal connector carrying said hose and having an opening in its face communicating with said hose, said connector being adapted to be placed against said fitting so as to enclose said port, means operable in the placement of the connector to open said valve, thereby, through said port and opening, providing closed air communication between said hose and pipe line, an electrical conductor extending along the pipe line, electrical terminals, forming part of the milking machine unit, one of which is electrically connected with the connector and the other of which is insulated therefrom, said connector being adapted, upon its placement as specified, to be electrically connected with the pipe line, and means adapted, upon said placement of the connector, to close the circuit between the second terminal and said conductor, said means comprising a ring surrounding said hose and connected with the last named terminal, an arcuate spring the central part of which is carried by and insulated from the fitting and in electrical connection with said conductor and between the free ends of which said ring passes in the placement movement of the connector.

8. A device for connecting and disconnecting the vacuum pipe of a milking machine installation with the portable hose of a milking machine unit for exhausting air therefrom, comprising a fitting having, in communication with the pipe line, a port open to the atmosphere and surrounded by a surface having a diameter multiple times that of the port, a valve normally held by the pressure of the atmosphere in position to close said port against admission of atmospheric air to said pipe, a terminal conductor carrying said hose and having a surface adapted to be placed in sealed relation with said surface of the fitting and having an opening therethrough in communication with said hose, and means, operable in the placement of said terminal in said sealed relation with the fitting, to move said valve away from said port and thereby, through said port and opening, establish communication between the vacuum pipe and the hose, the terminal being held in said sealed relation with the fitting by the excess of outside over inside pressure.

9. A connector as specified in claim 8, including also means to guide said terminal connector into correct relation with the fitting.

10. A connector as specified in claim 8, including also resilient means to hold one edge of the terminal connector in contact with said surface of the fitting.

11. A device for connecting the vacuum pipe line of a milking machine installation with the portable hose of a milking machine unit for exhausting air therefrom, and to simultaneously therewith electrically connect such unit with a source of electrical energy, comprising a fitting forming part of the pipe line and having a port opening from the interior of the pipe line to the atmosphere, a valve normally held against said port by atmospheric pressure, a terminal connector carrying said hose and having an opening in its face communicating with said hose, said connector being adapted to be placed with said face against said fitting so as to enclose said port and seal it from the atmosphere, means operable in the placement of the connector to open said valve and thereby, through said port and opening, pneumatically connect the hose with the pipe line, a binding post carried by and insulated from said fitting and a conducting wire connected therewith and through a source of electric current supply with the pipe line, electric terminals, forming part of the milking machine unit, carried by the connector and hose respectively, means to electrically connect the terminal connector with the fitting and thereby with the pipe line and other means to electrically connect the electric terminal carried by the hose with said binding post, said means being rendered operative in the placement of the connector as specified.

12. A device for connecting and disconnecting the vacuum pipe line of a milking machine installation with the portable hose of a milking machine unit, comprising a fitting forming a part of the pipe line and having a port opening from the interior of the pipe line to the atmosphere, a valve normally held against said port by atmospheric pressure, the fitting having a face surrounding said port and valve, a terminal connector carrying said hose and having a passage, communicating with said hose, surrounded by a face adapted to make air-tight connection with said face of the fitting when the connector is applied thereto, and means, operable in the placement of the connector, to unseat said valve and thereby pneumatically connect the hose with the pipe line, the terminal connector being held in said air-tight connection with the fitting by the excess of outside atmospheric pressure over the inside pressure in the vacuum line and hose.

JOHN L. HULBERT.